(No Model.) 3 Sheets—Sheet 2.
G. P. NEAL.
STABLE.
No. 596,007. Patented Dec. 21, 1897.
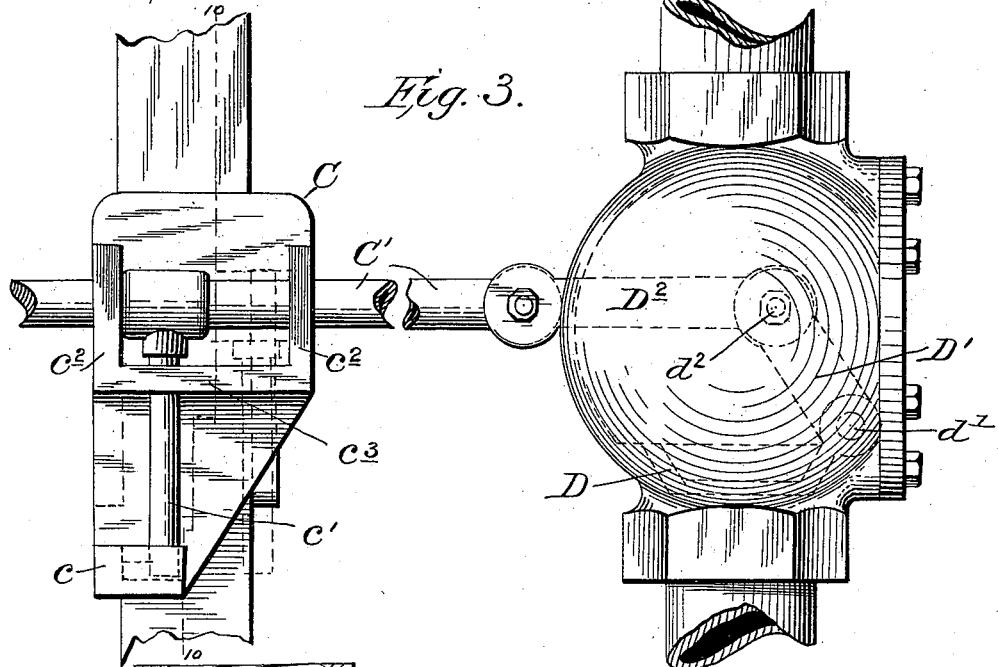
Fig. 3.
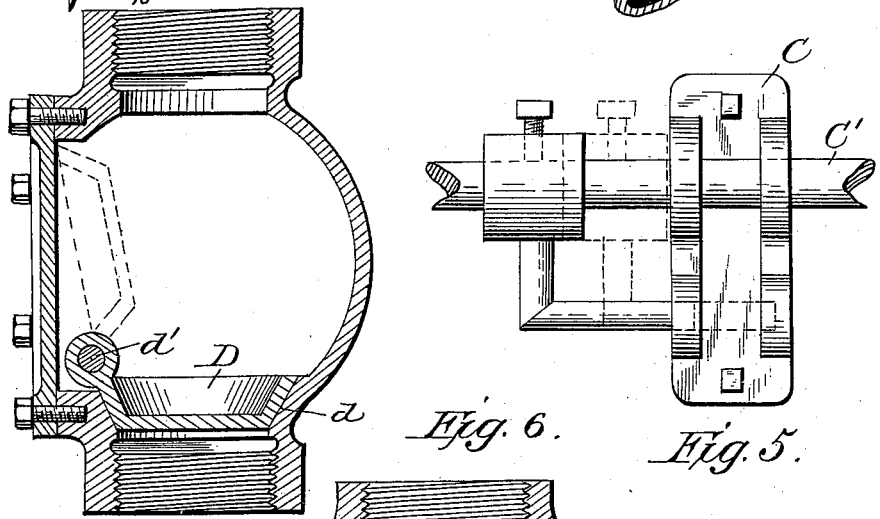
Fig. 4. Fig. 6. Fig. 5.
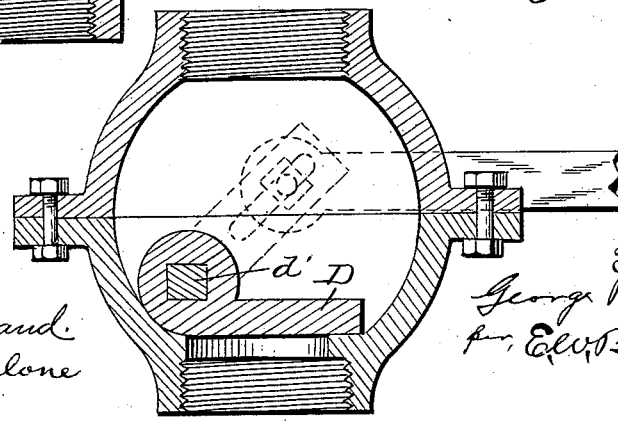
Witnesses
Franck L. Ourand.
John W. Malone
Inventor
George P. Neal,
per E.W. Bradford
Attorney (No Model.) 3 Sheets—Sheet 3.
G. P. NEAL.
STABLE.
No. 596,007. Patented Dec. 21, 1897.
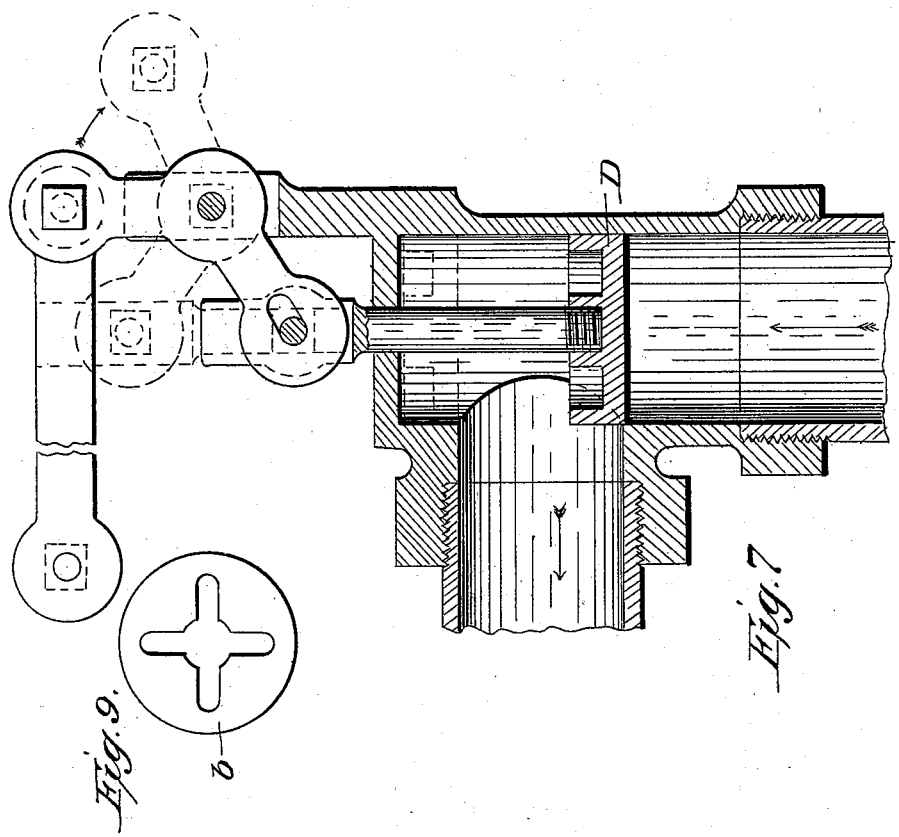
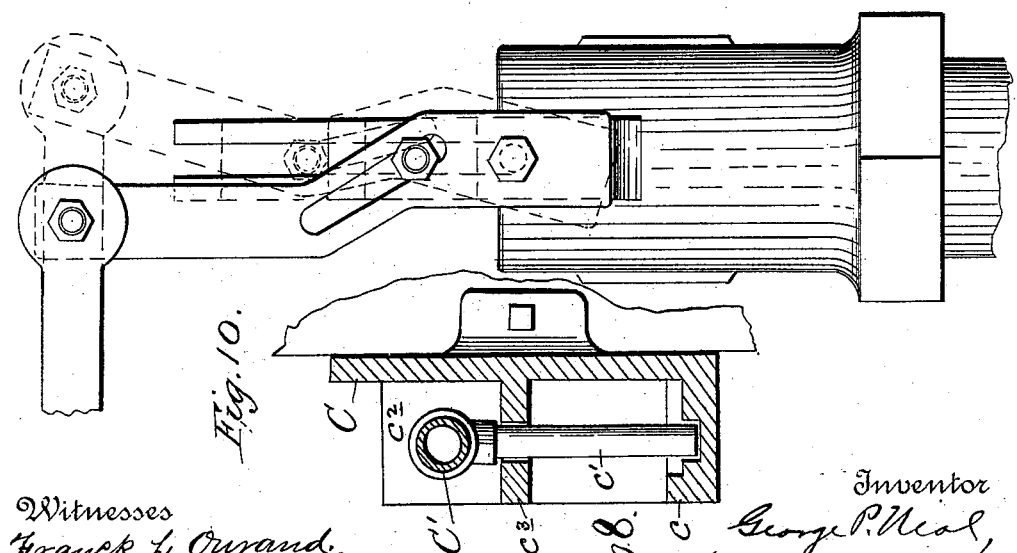
Witnesses
Franck L. Ourand.
John W. Malone
Inventor
George P. Neal,
per E. W. Bradford.
Attorney

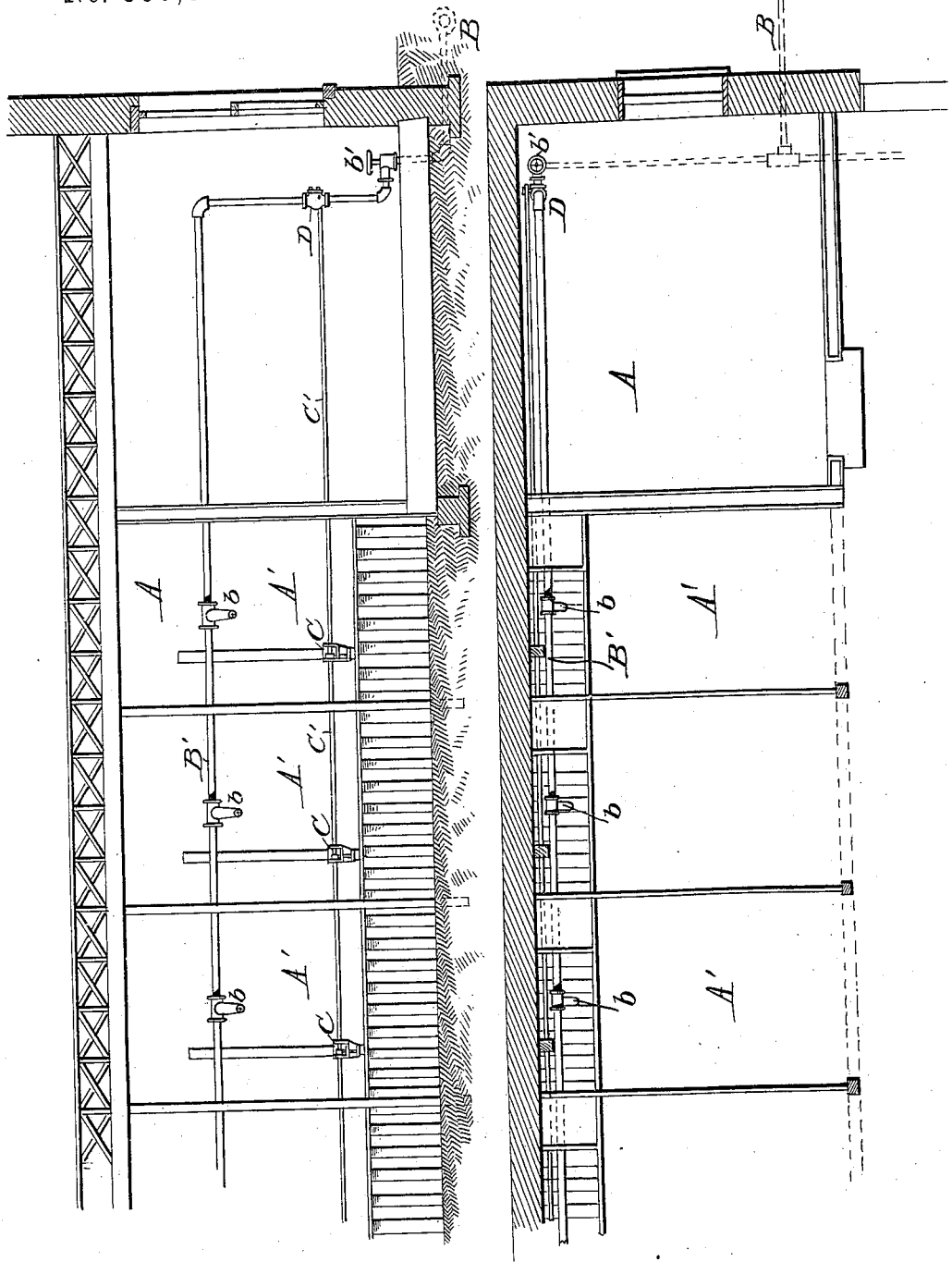

UNITED STATES PATENT OFFICE.

GEORGE P. NEAL, OF EVANSVILLE, INDIANA, ASSIGNOR OF TWO-THIRDS TO HENRY W. FLENTKE AND AARON M. WEIL, OF SAME PLACE.

STABLE.

SPECIFICATION forming part of Letters Patent No. 596,007, dated December 21, 1897.

Application filed August 17, 1897. Serial No. 648,583. (No model.)

*To all whom it may concern:*

Be it known that I, GEORGE P. NEAL, a citizen of the United States, residing at Evansville, in the county of Vanderburg and State of Indiana, have invented certain new and useful Improvements in Stables; and I do declare the following to be a full, clear, and exact description of the invention, such as will enable others skilled in the art to which it appertains to make and use the same, reference being had to the accompanying drawings, and to the letters of reference marked thereon, which form a part of this specification.

My said invention relates to certain improvements in the details of construction and arrangement of parts of fire-extinguishing and animal releasing and ejecting apparatus for use in stables, whereby upon the turning on of water from a valve suitably located the water-pressure operates automatically to unhitch the animals and drive them from their stalls and also to extinguish any fire which may be in the vicinity of said stalls, all as will be hereinafter more fully described and claimed.

Referring to the accompanying drawings, which are made a part hereof and on which similar letters of reference indicate similar parts, Figure 1 is an elevation looking into the front of a series of stalls in a section of stable equipped with my improved apparatus; Fig. 2, a plan view thereof; Fig. 3, a detail view of the unhitching device and the valve mechanism for operating it, on an enlarged scale; Fig. 4, a section through said valve; Fig. 5, a view of a modified form of unhitching device; Figs. 6, 7, and 8, views showing modified forms of operating-valves; Fig. 9, a view of the front end of the discharge-nozzle, showing the peculiar form of discharge-orifice therein; and Fig. 10, a section on the dotted line 10 10 in Fig. 3.

In said drawings the portions marked A represent the stable; B, the water-main; C, the unhitching device, and D the operating-valve.

The stable A may be any building in which animals are to be stabled. It is provided with stalls A', arranged in any approved manner.

The water-main B is intended to be connected with the city waterworks or with any supply of water under the needed pressure. A branch B' runs through the stable, being located on the front wall thereof at the proper height to be out of the way of the animal and to be effective in use. In each stall it is provided with a T-fitting, to which is connected the nozzle $b$. Each of said nozzles is formed with the discharge-orifice of the form shown in Fig. 9, which insures that the stream of water discharged shall spread in every direction and strike the animal, whether lying down or standing or in whatever position it may occupy in the stall. Said orifice is preferably in the form of a cross with a round center, as shown, which is regarded as the most effective for the purpose. A valve $b'$, conveniently located, preferably in the office, as shown, or outside the stable, if preferred, is provided, by which the water is turned on when required.

The unhitching device C consists of a bracket secured on a suitable support in the front of each stall, having a transverse catch $c$, with which the halter-ring or spring-hook is adapted to engage. Said ring or hook is retained on said catch by an arm $c'$, carried by a sliding rod (small pipe preferred) C', which is mounted in suitable perforations in outwardly-projecting ears $c^2$ near the top of said bracket. Said arm preferably extends through a slot in a flange $c^3$ just below said rod, which slot forms a guide and way therefor and insures its true operation. Its lower end is adapted to slide into an open-ended groove in the top face of the catch $c$ and thus secure the hitching ring or hook. Each stall being provided with one of said devices and all of the retaining-arms $c'$ being carried by a single operating-rod C' it is only necessary to provide for the operation of said rod to effect the unhitching of all the animals in a single line of stalls simultaneously, as will be readily understood. In Fig. 5 I have shown a form somewhat different, but operated in a similar manner. The halter-ring or spring-hook is connected with the horizontal part of an angle-arm which is adjustably mounted on the operating-rod and slides in transverse perforations in ears on the sides of the bracket near its lower end. When the rod is operated (by the water through the valve) to withdraw said arm, the ring or hook falls from between said ears, releasing the animal.

The operating-valve D, mounted in a suitable chamber or casing, is interposed in the main between the valve $b'$ and the branch B', leading to the stalls. It is formed to fit onto a suitably-formed seat $d$ in said casing just at the entrance thereto and is mounted to turn with a pintle $d'$. Said pintle extends through the side of said casing and has a crank D' on its outer end. A link $D^2$ is pivotally connected to the crank-pin $d^2$ thereof at one end and to the end of the operating-rod C' at its other end. The parts are so arranged, as shown in Fig. 3, that the opening of the valve D will operate the rod C' to withdraw the arms $c'$ from the catches $c$ and permit the halter-hooks to drop therefrom, thus releasing the animals. The turning on of the water by means of the valve $b'$ will thus operate the valve D and through it the unhitching devices, releasing the animal, and at the same time the water rushes through the pipe B' and the nozzles $b$, spreading in all directions over the animal and driving it from said stall to a place of safety. At the same time the fire within the reach of said water is quenched. The entire operation is thus quickly and simultaneously secured from the turning of a single valve $b'$, which is located at a place where it can be reached at all times, no matter where the fire may be or what headway it has attained. Any number of stalls desired may be connected to a single pipe, or the stable may be divided into as many sections as desired, to be operated by a single valve, as will be readily understood.

The modified form of valve shown in Fig. 6 is also a swing disk valve, in many respects similar to that just described, and will be readily understood from an inspection of the drawings, the differences being chiefly in details of construction, particularly in the manner of seating, and the connection between the crank and operating-rod, the connection to the crank being by means of a slot and that to the rod by an ordinary gas-pipe fitting.

The construction shown in Fig. 7 shows a piston-valve in lieu of a swing disk valve. The piston-stem is connected to one end of a bell-crank lever pivoted on the outside of the casing, the other end of said bell-crank being connected to the operating-rod. Fig. 8 shows a similar valve, but the piston-stem is provided with a cross-head which operates in vertical ways formed in standards on the sides of the casing. A lever is pivoted at one end to said casing and at the other end to the operating-rod. Midway its length it is provided with a diagonal slot. In this slot a pin projecting from the cross-head operates. As the piston moves up and down the top of said lever is thrown back and forth and said rod operated, as can be readily seen.

Said modifications are illustrated to show some of the differences in the form and arrangement of parts and the details of construction which may be readily made without departing from my said invention, which consists, broadly, in providing such an apparatus as that described to be operated automatically by the pressure of the water rushing through the pipes.

Having thus fully described my said invention, what I claim as new, and desire to secure by Letters Patent, is—

1. In an apparatus for unhitching animals and throwing water against them, the combination, of the water-main, a valve therein for turning on and off the water-supply, a pipe leading to the stall and provided with a nozzle, which pipe is connected with said main and is provided with a valve to be lifted by the water flowing through the pipe, the unhitching devices connected to an operating-rod, said operating-rod and a connection between said rod and the stem of said valve, whereby, when the water is turned into said pipe from said main, it operates said second valve and through it the unhitching devices, substantially as set forth.

2. In a stable, the combination, of the hitching devices, the unhitching apparatus consisting of an operating-rod, a pipe connected with a water-main, a valve mounted in said pipe to be lifted by the water flowing through it, a connection between the stem of said valve and said operating-rod, whereby the lifting of said valve operates said unhitching devices, the water-main and a valve therein for turning on and off the water, substantially as set forth.

3. The combination, in a stable, of the hitching devices, the unhitching apparatus connected to be operated by a rod, a water-pipe arranged in the front of the stalls with nozzles pointing into them, a water-main, a valve therein for turning on and off the water, said pipe and main being connected, a second valve mounted in said pipe with a projecting stem, said valve being arranged to be lifted by the water when turned into said pipe from the main, and a connection between said stem and the operating-rod, whereby the lifting of said rod operates said unhitching devices, substantially as set forth.

In testimony whereof I affix my signature in presence of two witnesses.

GEORGE P. NEAL.

Witnesses:
LOUIS F. KRAFT,
JESSE C. WEIL.